(12) United States Patent
Haitin (10) Patent No.: US 8,709,230 B2
(45) Date of Patent: *Apr. 29, 2014

(54) METHOD AND APPARATUS FOR EFFICIENT GAS PRODUCTION

(71) Applicant: HPT (Hydrogen Production Technology) AG, Gossau (CH)

(72) Inventor: David Haitin, Ramat Gan (IL)

(73) Assignee: HPT (Hydrogen Production Technology) AG, Gossau (CH)

(*) Notice: Subject to any disclaimer, the term of this patent is extended or adjusted under 35 U.S.C. 154(b) by 0 days.

This patent is subject to a terminal disclaimer.

(21) Appl. No.: 13/684,198

(22) Filed: Nov. 22, 2012

(65) Prior Publication Data

US 2013/0140190 A1 Jun. 6, 2013

Related U.S. Application Data

(63) Continuation of application No. 12/332,516, filed on Dec. 11, 2008, now Pat. No. 8,337,766.

(60) Provisional application No. 61/118,448, filed on Nov. 27, 2008.

(51) Int. Cl.
- *C25B 1/02* (2006.01)
- *B01J 19/08* (2006.01)
- *H05F 3/00* (2006.01)
- *C25B 1/04* (2006.01)
- *C01B 3/02* (2006.01)
- *C25B 9/00* (2006.01)
- *F02M 37/22* (2006.01)

(52) U.S. Cl.
CPC .... *C25B 1/04* (2013.01); *C01B 3/02* (2013.01)
USPC ...... 205/637; 422/186; 422/186.04; 210/243; 204/164; 204/242

(58) Field of Classification Search
USPC .............. 205/637; 204/164, 242; 422/186.04
See application file for complete search history.

(56) References Cited

U.S. PATENT DOCUMENTS 8,337,766 B2 * 12/2012 Haitin ...................... 422/186.04

* cited by examiner

*Primary Examiner* — Dirk Bass
*Assistant Examiner* — Jennifer Wecker
(74) *Attorney, Agent, or Firm* — Vladamir Sherman; Professionals Patent Solutions (57) ABSTRACT

An apparatus and method for sorting ions in order to produce gas from liquid. A first electric field source is electrically insulated from the liquid by an insulating layer. A first conductive deionization surface is positioned in the liquid and within a field line of the first electric field source. An electric conductor is connected to the first conductive deionization surface to discharge charge built up due to attracted ions located on the first conductive deionization surface. The gas is produced on said first conductive deionization surface when said first conductive deionization surface is positioned within the water.

17 Claims, 4 Drawing Sheets

METHOD AND APPARATUS FOR EFFICIENT GAS PRODUCTION

FIELD OF THE INVENTION

The present invention generally relates to the field of electrochemistry. More specifically, the present invention relates to a method and apparatus for ionic sorting, for example during separation of hydrogen ions and oxygen ions from water.

BACKGROUND

Hydrogen has been widely recognized as a potential fuel of the future. Today, hydrogen is commonly produced by extraction from hydrocarbon fossil fuels via a chemical path. Hydrogen may also be extracted from water via biological production in an algae bioreactor, or using electricity (by electrolysis), chemicals (by chemical reduction) or heat (by thermolysis); these methods are less developed for bulk generation in comparison to chemical paths derived from hydrocarbons. The discovery and development of less expensive methods of bulk production of hydrogen will accelerate the establishment of a Hydrogen fuel source.

Another source of Hydrogen production is Electrolysis of water, which is the decomposition of water ($H_2O$) into oxygen ($O_2$) and hydrogen gas ($H_2$) due to an electric current being passed through the water. This electrolytic process is used in some industrial applications when hydrogen is needed.

An electrical power source is connected to two electrodes, or two plates, (typically made from some inert metal such as platinum or stainless steel) which are placed in the water. Hydrogen will appear at the cathode (the negatively charged electrode, where electrons are pumped into the water), and oxygen will appear at the anode (the positively charged electrode). The generated amount of hydrogen is twice the amount of oxygen, and both are proportional to the total electrical charge that was sent through the water.

Electrolysis of pure water is very slow, and can only occur due to the self-ionization of water. Pure water has an electrical conductivity about one millionth that of seawater. It is sped up dramatically by adding an electrolyte (such as a salt, an acid or a base).

Historically, the first known electrolysis of water was done by William Nicholson and Anthony Carlisle in about 1800.

U.S. Pat. No. 4,427,512 attempts to address the issue of hydrogen production. However, its arrangement is flawed due to an inherent buildup of field screening charge.

There is a need in the field of electrochemistry for improved methods, devices and system for extracting hydrogen from water.

SUMMARY OF THE INVENTION

The present invention is a method and apparatus for ionic sorting. According to some embodiments of the present invention a first electric filed source may be arranged in proximity with one or more deionization surfaces. The one or more deionization surfaces may be located within a path of, and perpendicular to, at least some of the electric field lines generated by the first electric field source. The deionization surfaces may be composed of an electrically conducting material. The electric field generated by the first electric field source (example based on a positive E field source) may cause free ions, positive and negative, present between the two deionization surfaces to migrate towards respective deionization surfaces, where positive ions migrate in the same direction as the electric field line and negative ions migrate in the opposite direction of the field lines. According to some embodiments of the present invention, a volume between the two deionization surfaces may be at least partially filled with water and may include both positive hydrogen ions and negative oxygen ions.

According to some embodiments of the present invention, the conducting material of each of the deionization surfaces may be populated with electrical charges (e.g. electrons or holes) in sufficient quantities to deionize at least some ions which come in contact with a given deionization surface—for example (example based on a positive E field source) some positive ions coming in contact with the deionization surface further away from electric field source may receive one or more electrons and negative electrons coming in contact with the deionization surface closer to the field source may give up one or more electrons. According to some embodiments of the present invention, the two deionization surfaces may be electrically connected to one another through an electrical shunt. According to further embodiments of the present invention, each of the deionization surfaces may be connected to electrical ground, directly or through a switch. According to further embodiments of the present invention, one or more electrical shunts and/or a portion of one or more of the conducting surfaces may be shielded from the electric field—for example, with a grounded electrically conductive material geometrically configured to block the electric field.

According to further embodiments of the present invention, there may be provided an electric power source to provide the first field source with electrical charges required to produce an electric field. The first electric field source may be electrically isolated from the deionization surfaces and/or from the ions within the volume between the deionization surfaces. A controller may regulate the operation of the power source and/or any switch which may connect the power source to the electric field source. The controller may connect the power source to the electric field source for a duration/period sufficient to charge the field source to a charge density required in order to generate an electric field of an intended field strength—after which duration the controller may disconnect the field source from the power source, leaving the field source floating. There may be provided a diode between the power source and the field source to prevent charge from flowing out of the field source. The controller may intermittently reconnect the power source to the field source in order to compensate for charge leakage from the field source.

According to embodiments of the present invention where deionization surfaces are connected to electrical ground through an electric switch, the controller may regulate/control, directly or indirectly, the switching of the ground switch. The ground switch may be used to charge or discharge the deionization surfaces so as to mitigate a possible screening effect which may occur due to charge buildup on the deionization surfaces.

According to further embodiments of the present invention, there may be provided a pair of complimentary field sources, where each field source may be of an opposite polarity from the other, and may be positioned on opposite sides of the volume defined by the two deionization surfaces. The pair of electric field sources may be arranged in proximity with one another, where each field source may produce a field of a different polarity, such that the field lines generated by each field source constructively combine within the volume defined between the two deionization surfaces. Each source may consist of a planer conductor coated with either an insolative or dielectric material. Each of the sources may be electrically charge using a current/voltage source. Each of the sources may be charged with a charge opposite relative to the charge of the other source.

According to some embodiments of the present invention, the insolative or dielectric coatings on each of the electric field sources may be further coated with a coating of conductive material, which coating of conductive material may define a deionization surface. The conductive coating on each source may be electrically connected to the conductive coating on the other source through an electrical connector or shunt. As described above, each conductive coating (i.e. deionization surface) may be connected to ground through a grounding switch, which grounding switch may be regulated by a controller. According to further embodiments of the present invention, the one or more grounding switches may simply be oscillating according to a predefined duty cycle.

The electrical connector/shunt between the two conductive coatings may be arranged and/or constructed such that electric field influence on charges inside the connector/shunt, from the electric field(s) generated by the field source(s), is mitigated. According to some embodiments of the present invention, there are provided one or more electric field shielding structures for shielding one or more portions of the connector/shunt and/or one or more portions of the conductive material. The electric field shielding structures may be grounded. Any electric field shielding methodology, technique or material, known today or to be devised in the future may be applicable to the present invention.

According to further embodiments of the present invention, the above structure may be immersed in a fluid such as water. The electric fields generated by the two field sources may apply forces to charged ions within the fluid, and each field source may attract ions having a charge with an opposite polarity to the polarity of the field source. Charged ions reaching the conductive coating of a given field source may discharge or de-ionize, due to charge interaction with charges on the conductive coating with which they come in contact. Discharged or de-ionized molecules may cease to interact or be otherwise influenced by the electric field(s). Charges deposited by the ions on the conductive coatings may pass from one conductive coating to the other conductive coating on a paired electric field source through the electric connector. De-ionized molecules may be collected at, around or above the conductive coating area at which they were de-ionized. In the example where water ($H_2O$) is the fluid within which the electric field sources are immersed, Hydrogen molecules may collect and be buoyed upward at or around the negative electric field source, while Oxygen molecules may collect and be buoyed upward at or around the positive electric field source.

According to further embodiments of the present invention, there may be provided one or more gas carrying and/or gas storage structures such as hollow tubes, pipes and/or gas containers. A single tube inlet may be positioned above the entire structure or separate inlets may be positions over the separate deionization surfaces. Any method of gas collection and separation, known today or to be devised in the future, may be applicable to the present invention.

According to further embodiments of the present invention, the above described arrangement may be mirrored into an array of field sources and deionization surfaces. According to some array directed embodiments, there may be provided an electrical insulator and a deionization surface on either side of a single field source, and field sources may be consecutively arranged with alternating polarities in arrays having 3 or more electric field sources. The number of field sources which may be included in an array according to embodiments of the present invention may only be limited by fabrication capabilities and available operating space.

According to some embodiments of the present invention, the field sources may be charged to +/−25 KV, which voltages may be provided by two 25 Kv power supplies for about 10 ma—Supplies with on/off control (E.g. made by "Emco"— dimensions of about 30×15×10 cm.)

PBN ceramics may be used an insulator layer, and the Graphite (carbon) as a conductive layer.

According to some embodiments of the present invention, there may be provided a control system for maintaining a water level of the water between the field sources. The control system may include a sensor for sensing water level, a water supply, a water pump and tubes. A control circuit of the control system may cause the pump to activate and carry water from the water source to the area between the field sources each time the sensors indicate that the water level has dropped below some predefined level.

According to further embodiments of the present invention, there may be provided one or more heating elements and a temperature control system adapted to maintain the water at a predefined temperature or range of temperatures.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention is a method and apparatus for ionic sorting. According to some embodiments of the present invention a first electric filed source may be arranged in proximity with one or more deionization surfaces. The one or more deionization surfaces may be located within a path of, and perpendicular to, at least some of the electric field lines generated by the first electric field source. The deionization surfaces may be composed of an electrically conducting material. The electric field generated by the first electric field source (example based on a positive E field source) may cause free ions, positive and negative, present between the two deionization surfaces to migrate towards respective deionization surfaces, where positive ions migrate in the same direction as the electric field line and negative ions migrate in the opposite direction of the field lines. According to some embodiments of the present invention, a volume between the two deionization surfaces may be at least partially filled with water and may include both positive hydrogen ions and negative oxygen ions.

According to some embodiments of the present invention, the conducting material of each of the deionization surfaces may be populated with electrical charges (e.g. electrons or holes) in sufficient quantities to deionize at least some ions which come in contact with a given deionization surface—for example (example based on a positive E field source) some positive ions coming in contact with the deionization surface further away from electric field source may receive one or more electrons and negative electrons coming in contact with the deionization surface closer to the field source may give up one or more electrons. According to some embodiments of the present invention, the two deionization surfaces may be electrically connected to one another through an electrical shunt. According to further embodiments of the present invention, each of the deionization surfaces may be connected to electrical ground, directly or through a switch. According to further embodiments of the present invention, one or more electrical shunts and/or a portion of one or more of the conducting surfaces may be shielded from the electric field—for example, with a grounded electrically conductive material geometrically configured to block the electric field.

According to further embodiments of the present invention, there may be provided an electric power source to provide the first field source with electrical charges required to produce an electric field. The first electric field source may be electrically isolated from the deionization surfaces and/or from the ions within the volume between the between the deionization surfaces. A controller may regulate the operation of the power source and/or any switch which may connect the power source to the electric field source. The controller may connect the power source to the electric field source for a duration/period sufficient to charge the field source to a charge density required in order to generate an electric field of an intended field strength—after which duration the controller may disconnect the field source from the power source, leaving the field source floating. There may be provided a diode between the power source and the field source to prevent charge from flowing out of the field source. The controller may intermittently reconnect the power source to the field source in order to compensate for charge leakage from the field source.

According to embodiments of the present invention where deionization surfaces are connected to electrical ground through an electric switch, the controller may regulate/control, directly or indirectly, the switching of the ground switch. The ground switch may be used to charge or discharge the deionization surfaces so as to mitigate a possible screening effect which may occur due to charge buildup on the deionization surfaces.

According to further embodiments of the present invention, there may be provided a pair of complimentary field sources, where each field source may be of an opposite polarity from the other, and may be positioned on opposite sides of the volume defined by the two deionization surfaces. The pair of electric field sources may be arranged in proximity with one another, where each field source may produce a field of a different polarity, such that the field lines generated by each field source constructively combine within the volume defined between the two deionization surfaces. Each source may consist of a planer conductor coated with either an insolative or dielectric material. Each of the sources may be electrically charge using a current/voltage source. Each of the sources may be charged with a charge opposite relative to the charge of the other source.

According to some embodiments of the present invention, the insolative or dielectric coatings on each of the electric field sources may be further coated with a coating of conductive material, which coating of conductive material may define a deionization surface. The conductive coating on each source may be electrically connected to the conductive coating on the other source through an electrical connector or shunt. As described above, each conductive coating (i.e. deionization surface) may be connected to ground through a grounding switch, which grounding switch may be regulated by a controller. According to further embodiments of the present invention, the one or more grounding switches may simply be oscillating according to a predefined duty cycle.

The electrical connector/shunt between the two conductive coatings may be arranged and/or constructed such that electric field influence on charges inside the connector/shunt, from the electric field(s) generated by the field source(s), is mitigated. According to some embodiments of the present invention, there are provided one or more electric field shielding structures for shielding one or more portions of the connector/shunt and/or one or more portions of the conductive material. The electric field shielding structures may be grounded. Any electric field shielding methodology, technique or material, known today or to be devised in the future may be applicable to the present invention.

According to further embodiments of the present invention, the above structure may be immersed in a fluid such as water. The electric fields generated by the two field sources may apply forces to charged ions within the fluid, and each field source may attract ions having a charge with an opposite polarity to the polarity of the field source. Charged ions reaching the conductive coating of a given field source may discharge or de-ionize, due to charge interaction with charges on the conductive coating with which they come in contact. Discharged or de-ionized molecules may cease to interact or be otherwise influenced by the electric field(s). Charges deposited by the ions on the conductive coatings may pass from one conductive coating to the other conductive coating on a paired electric field source through the electric connector. De-ionized molecules may be collected at, around or above the conductive coating area at which they were de-ionized. In the example where water (H2O) is the fluid within which the electric field sources are immersed, Hydrogen molecules may collect and be buoyed upward at or around the negative electric field source, while Oxygen molecules may collect and be buoyed upward at or around the positive electric field source.

According to further embodiments of the present invention, there may be provided one or more gas carrying and/or gas storage structures such as hollow tubes, pipes and/or gas containers. A single tube inlet may be positioned above the entire structure or separate inlets may be positions over the separate deionization surfaces. Any method of gas collection and separation, known today or to be devised in the future, may be applicable to the present invention.

Figure 1:
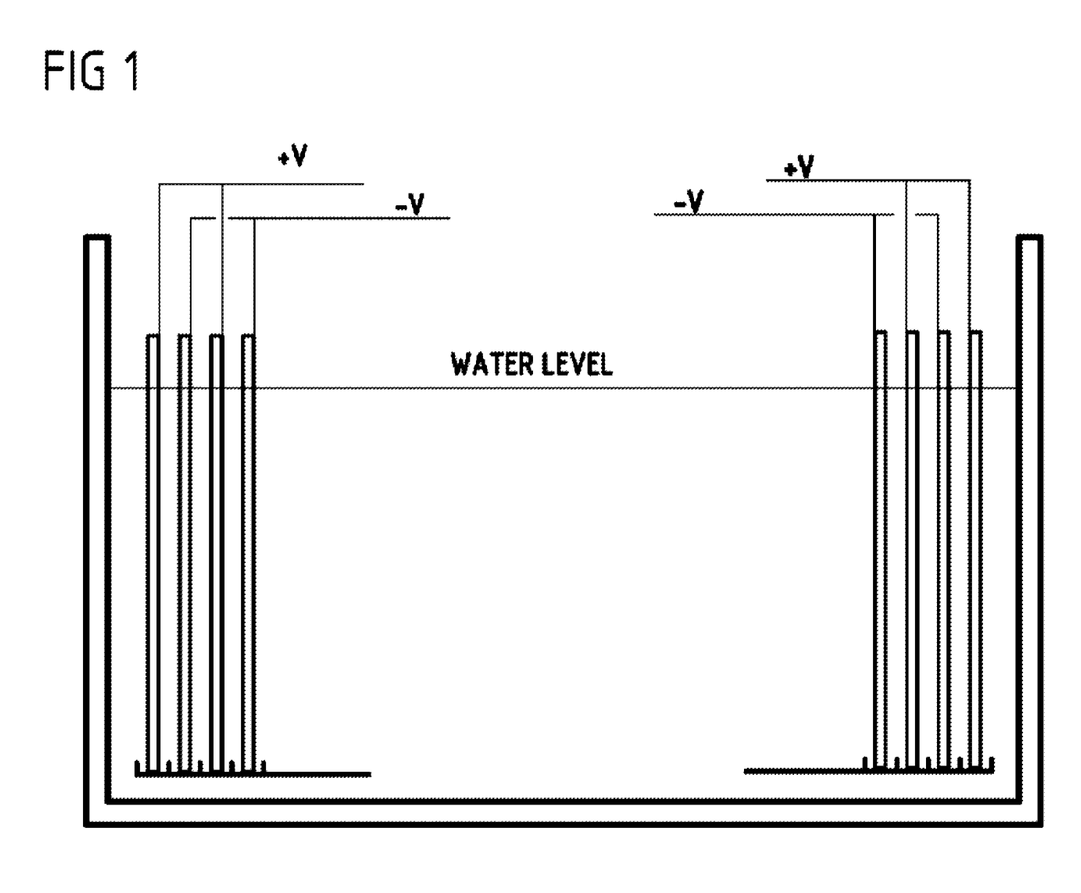
FIG. 1 is a diagram showing an arrangement of paired electric field sources used for producing hydrogen from water, in accordance with embodiments of the present invention.

According to further embodiments of the present invention, the above described arrangement may be mirrored into an array of field sources and deionization surfaces. According to some array directed embodiments, there may be provided an electrical insulator and a deionization surface on either side of a single field source, and field sources may be consecutively arranged with alternating polarities in arrays having 3 or more electric field sources. The number of field sources which may be included in an array according to embodiments of the present invention may only be limited by fabrication capabilities and available operating space. Turning now to FIG. 1, there is shown a diagram of an arrangement of paired electric field sources used for producing hydrogen from water in accordance with embodiments of the present invention.

Figure 2:
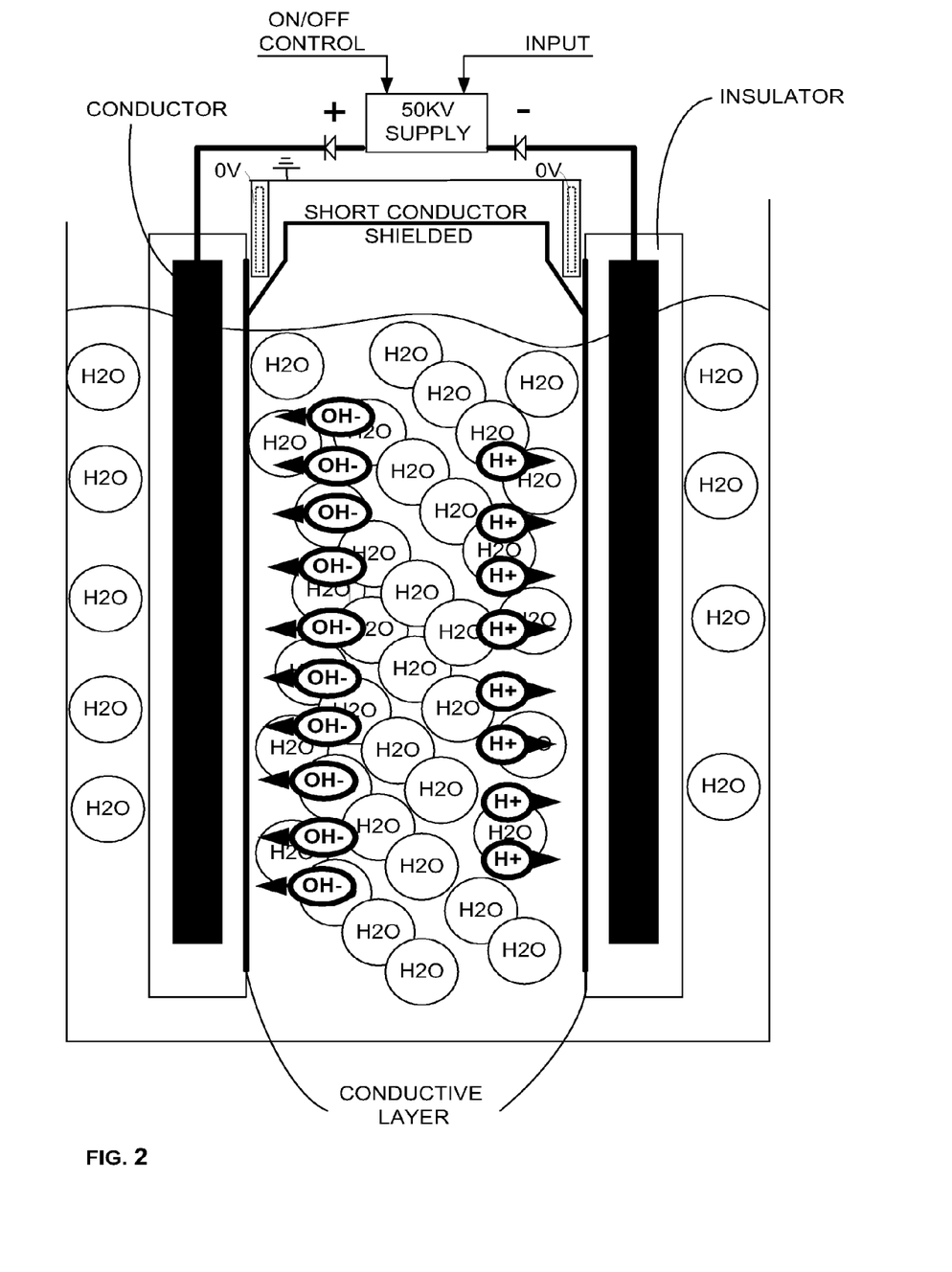
FIG. 2 is a diagram showing exemplary embodiments, including a single pair of field sources, and their associated circuits and structures, used to produce hydrogen from water in accordance with some embodiments of the present invention.

Turning now to FIG. 2, there is shown a diagram of an exemplary embodiment of a single pair of field sources and associated circuits and structures. According to the embodiments of FIG. 2, the conductive material forming a dionization surface on a first field source is electrically connected to conductive material forming a deionization surface on a second field source. Two electric field shielding structures are used to shield a portion of the conductor/shunt connecting the first and second deionization surfaces. The field shielding structures are grounded.

Figure 3:
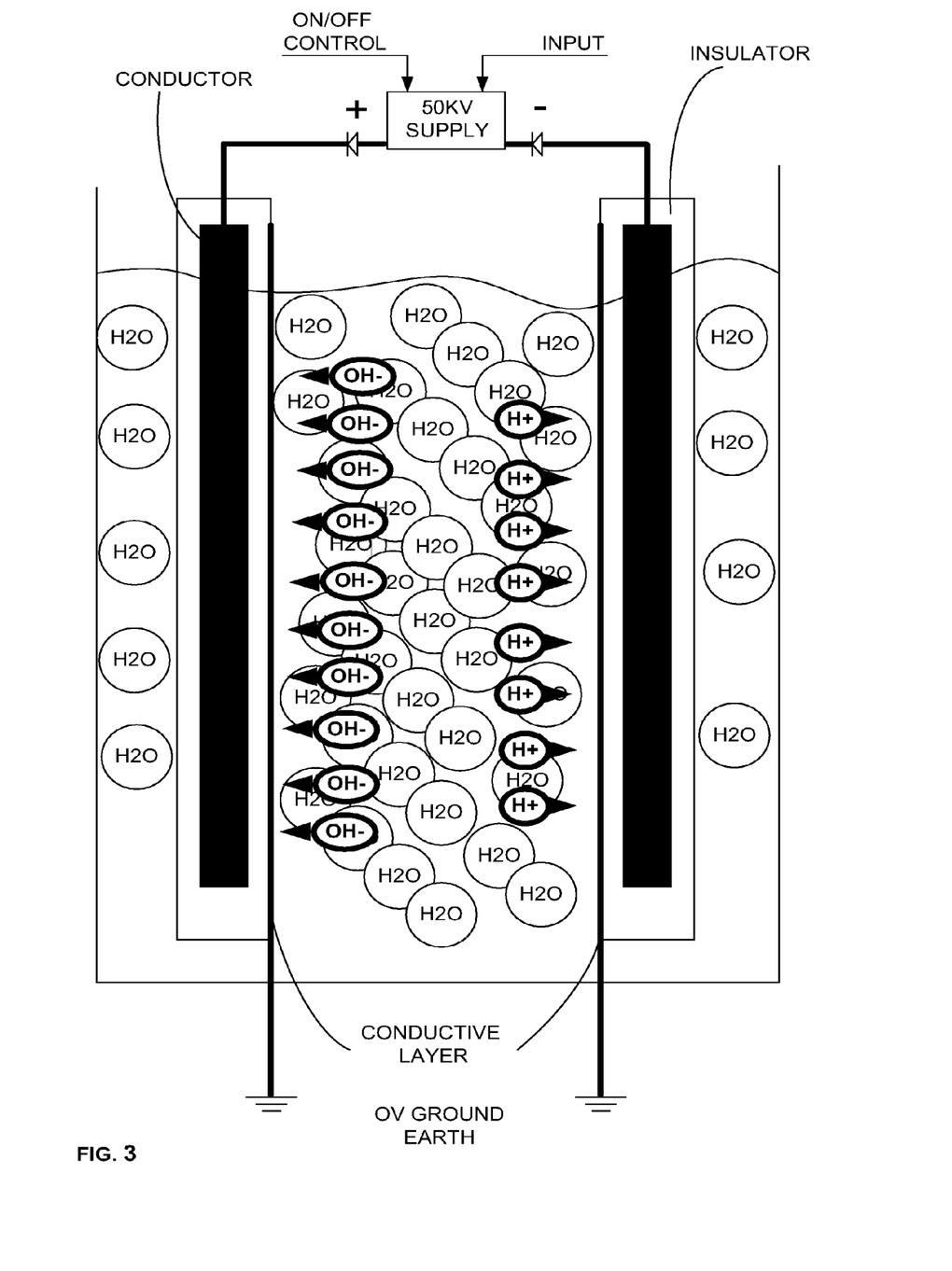
FIG. 3 is a diagram showing a second exemplary embodiment of a single pair of field sources, and their associated circuits and structures, used to produce hydrogen from water in accordance with some embodiments of the present invention.
Figure 4:
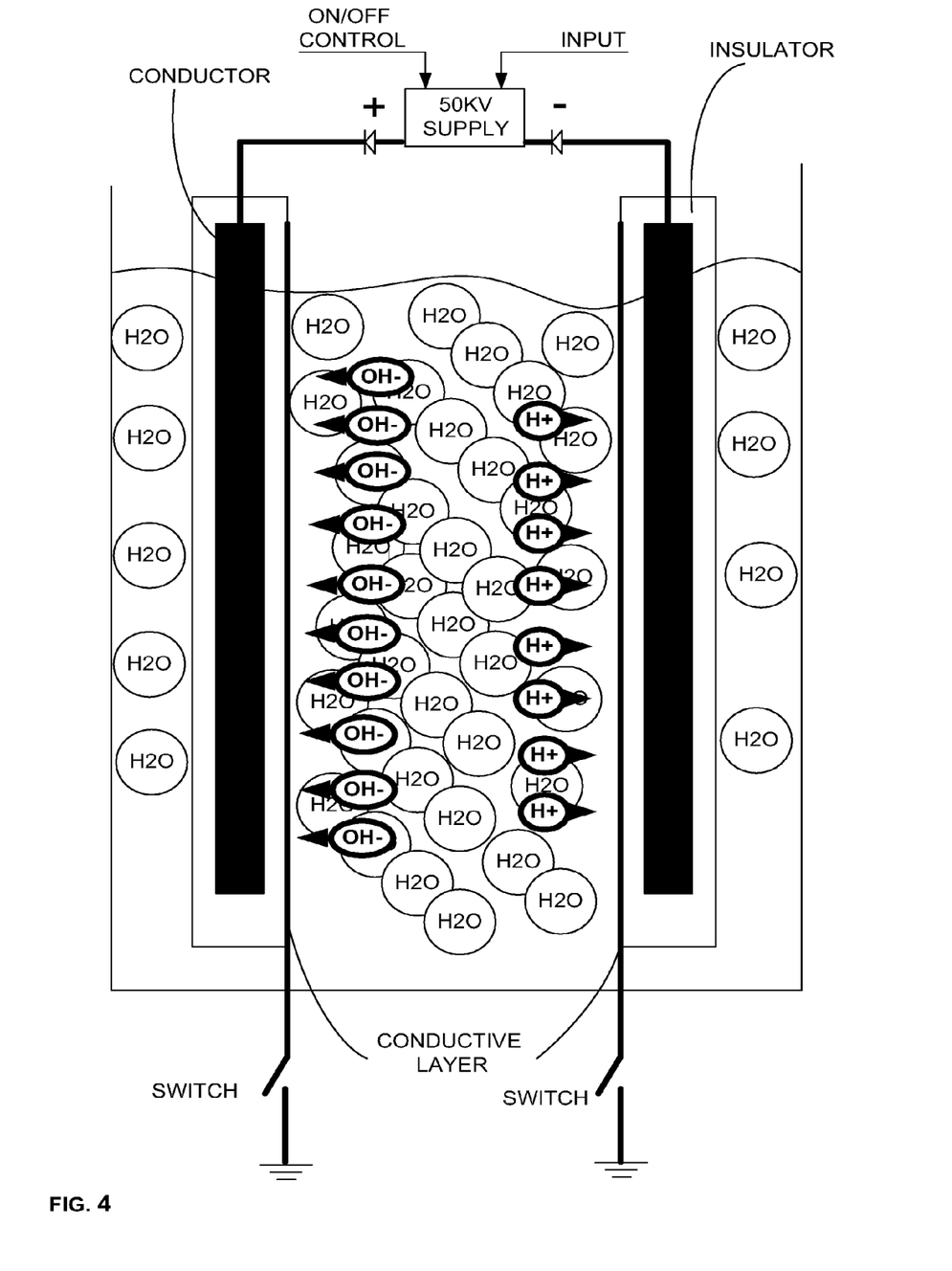
FIG. 4 is a diagram showing a third exemplary embodiment of a single pair of field sources, and their associated circuits and structures, used to produce hydrogen from water in accordance with some embodiments of the present invention.

Turning now to FIG. 3, there is shown a diagram with an exemplary embodiment of a single pair of field sources, where each of the deionization surfaces is grounded. The embodiment of FIG. 4 shows the conductive material forming the deionization surfaces grounded through switches, which switches may either be regulated by a controller or may simply oscillate.

Water (H2O) Related Embodiment

Theoretical Basis for Hydrogen & Oxygen Parsing:

According to some methods of the present invention, there may be provided 3 simultaneous processes: water molecule ionization, pulling of the free ions towards electrically conductive layers where the ions receive or give up electrons, and a current of electron exchange between conductive layers which accepted or gave up electrons to the ions.

The method of ionization may use the water's own Enthalpy and may substantially consume a negligible amount of energy from external electric power sources. At the positive electrode each 4 HO− ions turn to O2 and two additional H2O molecules. As a result, there is no accumulation of HO− ions in the water.

The Natural Process of Ionization: (creating OH−/H+)

Water's Enthalpy is the energy source for naturally occurring breakdown into ions of water molecules. Ionization occurs due to kinetic vibrations of the water molecules which are directly dependent on the water's Enthalpy (temperature serves as an indication). The water's acidity level (PH) is nearly constant and is dependent on the amount of H3O (free H+ ions that skip from one molecule to the next, at the loose H3O bonding/tie). Ionization of the water may cool down the water because the formed ions are of a higher energy level than the water molecules.

An increase in the water molecules' kinetic energy may be directly related by some factor to a rise in temperature. For example, the ionization rate of water is increased by a multiple of 15 between 0 and 25 degrees C. However, ion density remains largely unchanged at any given temperature due to the fact that increased temperatures also result in faster ion reattachment. For Example, whereas at 25 degrees, ions reattach within 70 micro-seconds of ionization (this value corresponds to the calculation of the almost constant ratio of ionized molecules, i.e. PH), at 50 degrees, ionization rate will increase at the same ratio (about double), and the time it takes to reconnect or reattach decreases at the same ratio (half) (since the particles' movements are faster)—hence the PH remains almost constant.

Ion Pulling Process:

The electrostatic force applied by the electric field sources positioned on opposite sides of a quantity of water may attract/pull a non-negligible portion of the free ions (those bouncing/hopping between the H3O ties) towards respective corresponding field sources and thus may inhibit ion reconnecting—primarily because a strong covalent force is prevented from forming.

The following are estimations of voltages, forces, currents and quantities of gas production based on some embodiments of the present invention:

Calculation of Attraction Forces in the Process:

A water mole (18 grams) comprises $6*10^{23}$ molecules (Avogadro's number), accordingly 1 cubical millimeter ($mm^3$) comprises $3.3*10^{19}$ molecules. At any given moment about $10^{-8}$ of the molecules may be ionized. Accordingly, within a volume of 1 $mm^3$, $3.3*10^{11}$ molecules may be naturally ionized.

Every ionized molecule may "take" an average volume of $3*10^{-12}$ mm$^3$. Such a volume is created by a length size of $1.5*10^{-4}$ mm to the third power. Hence, there may be an average distance of 1,500 Angstroms (in every direction) between neighboring free ions.

The Electrostatic force applied on a free ion (at an average distance relative to an electrodes pair (20×20 cm electrodes, at 1.5 mm spacing (including the isolation layers), having charged from a 50 kv source)):

$$F=9*10^9*1.6*10^{-19}*3.3*10^{-9}/\text{Sqr}(0.79*10^{-3})=7.6*10^{-12} Nt$$

The electric force between a couple of free ions at a distance of lust 100 Angstroms is:

$$F=9*10^9*\text{Sqr}(1.6*10^{-19})/\text{Sqr}(100*10^{-10})=2.2*10^{-12} Nt$$

Comment: For comparison, the power of the covalent force is approximately $5*10^{-9}$ Nt.

Conclusion: Already at a distance of $100_A$ (which is one magnitude smaller than the average distance between free ions), electric force between neighboring ions is weaker than the extending (towards/away) force which is applied, and thus a significant percentage of the free ions will not meet and reconnected but rather be pulled to the apparatus electrodes.

The Electrons Exchange Process: (Between a Couple of Neighboring Conductive Layers)

The conductive layer (a few microns thick) contains free electrons. It is submerged in water and the free ions stick to it. The free electrons in the coating are pushed/pulled to its surface (internal or external, according to the electrode's polarity), a phenomena that increases the coating's resistance (per cm$^2$) similar to the skin-effect phenomena.

The coating does not screen/block the electrostatic force between the electrodes, as it is electrically floating and its electrical charge is balanced although particle separation occurs within it.

Current flow (electrons) within the flat conductive coating is not slowed/stopped/resisted by the electrostatic force, as the force is perpendicular to the current flow direction.

The problem of current slowing/stopping/being resisted—in the very short conductor that connects the two conductive layers to one another:

The very short conductor is parallel to electric field and thus the current within it is affected or even stopped.

The Solution to the Problem:

At the center of the top side of each electrode, a rectangular metallic 10*50 mm plate is installed.

The plate is coated with an insulating layer for low voltage (i.e. Teflon), and it covers only a small area (about 10*10 mm) of the large electrode and sticks out upwards, all the way to an area where the electric field is relatively weak.

The plate (isolated from the electrode's conductive coating layer) is connected to ground's potential and creates a regional screening of the electrostatic force—there are plates on both sides of the working distance.

The very short conductor connecting the two conductive layers of the working space is adjacent to the center of the screening plates and is thus unaffected by the electric field, and may allow for an undisturbed current flow in any direction.

Volume Calculations:

The production cell (container) comprising e.g. 300 working spaces (1.2 mm water+2 insulation layers) and electrodes area of 20*20 cm. A volume of trapped water in all of the spaces=14.4 liters.

The electrode's insulating layer may be, for example, made of PBN (ceramic coating), at a thickness of 0.15 mm. The PBN has a dielectric strength of 5 Kv/mil and an extremely high resistance, hence minimal leakage.

At a temperature of 60 degrees, statistically, every molecule breaks apart at least every 30 minutes.

Thus, within an hour, all molecules within a 28.8 liter volume go through ionization (but immediately reattach). Accordingly it may be regarded as the amount of free ions, out from 8 cm$^3$ of water, every 1 sec.

In general, for a 1 KwHr Hydrogen production cell, 468 cm$^3$ of water has to be dismantled ('broken apart') in an hour (the amount is doubled as each molecule contributes a single Hydrogen ion), or 0.13 cm$^3$ water per second. Accordingly, for a 5 KwHr Hydrogen production cell, an amount of 0.65 cm$^3$ per second must be dismantled ('broken apart').

The Electrostatic Force: (Pulling Free Ions)

The capacitance between two electrodes: (area=20*20 cm, gap including insulation layers=1.5 mm, dielectric constant 25. (Dielectric constant at 0 Hz and using a system wide treatment for removing foreign ions)).

$$C=8.85*10^{-12}*25*0.20*0.20/1.5*10^{-3}=5.9 NF$$

For a couple of power sources (+/−25 KV), the charge of the abovementioned capacity=(C*V)=$2.95*10^{-4}$ Coul (Coulomb). The power sources charge the capacity of the whole cell within approximately 2 seconds, sources are then turned off for minutes (in accordance with the PBN's coating leakage rate, which is minor). Hence, merely single digit percentage of the energy amount within the Hydrogen produced was essentially put into its production—as electric energy.

The Ions Affecting Force: (at an Average Distance from the Electric Force)

In the water every ion 'sees' in front of it a small segment of the electrode's area. The segment along with its force lines creates a cone shape which base is at the electrode. The segment's charge=the average distance e.g. 0.75 mm, thus, in an approximate calculation, the diameter of the cone's base is equal to the distance and thus the forces cone's base segment area is 0.442 mm$^2$. Accordingly, the cone's charge=$3.3*10^{-9}$ Coulomb (a fraction of the full area and the charge of the electrode). The average length of the cone's force lines=0.79 mm.

The Ion Affecting Force: (at an Average Distance from the Electric Force)

$$F=9*10^9*1.6*10^{-19}*3.3*10^{-9}/\text{Sqr}(0.79*10^{-3})=7.6*10^{-12} Nt$$

The effect of the force is doubled—$1.52*10^{-11}$ Nt, as it concurrently pulls and pushes the two ion types (H+OH−) and thus lessens the chances for reattachment.

Comment: The doubled force is about two magnitudes weaker than the strong covalent force (although it does Not exist at the ionic state), but the force is two magnitudes stronger than the average forces (at the average distance described above) occurring between the free ions.

Comment: The force affecting ions which are at different distances is nearly equal. It is weakening in relation to the range, nevertheless, the area of the forces' cone base grows accordingly, causing the two changes to cancel each other out (both are squared [2$^{nd}$ power]).

Description of the Structure and Process

In an array of e.g. 300 working spaces (electrode couples of +/−HV) which are well insulated from the water—in other words—pairs of capacitors, producing a strong electrostatic force that pulls free ions and sticks them to the insulation layers.

The force is significant and prevents some percentage of the free ions (lacking covalent bond and affected by equivalent forces from all directions) to reconnect and form water molecules.

Near the faces of the insulating layers, there are thin layers (few microns) of a conductive substance that has a certain resistance (magnitude of several Ohms per $cm^2$). Notice: the conductive layer is not 'attacked' by $O_2$ or OH−. An appropriate substance may be Graphite—which is cheap and plentiful, easy to coat with, and only Oxidizes at temperatures of hundreds or thousands degrees.

The conductive coating is electrically floating and/or is partially charged with a low voltage (due to ion accumulation), and thus does not influence the electrostatic force passing through it in the direction of the water (its charge is balanced although its free electrons are pulled/pushed to its surface).

The goal is to prevent screening and force weakening, as well as to further separate and cancel coexisting electric charges and forces between different ions.

Ions—Quantities and Movement:

According to a prior calculation, the whole production cell handles ions that are produced from 8 $cm^3$ of self-ionized water per second.

Even under the assumption that merely 8% of the ions are able to reach the electrodes, still, a rate of 0.65 $cm^3$ per second is achieved (equivalent to 5 KWh of H2 energy) and accordingly, every working space (e.g. 300) handles $2.2*10^{-3}$ $cm^3$ water per second.

A water mole (18 grams) comprises $6*10^{23}$ molecules (Avogadro's number), hence the cell pulls $2.2*10^{22}$ free ions per second, or $7.2*10^{19}$ at each working space (e.g. 300) per second.

The ions pass an average distance of 0.6 mm within the water and the force accelerates them to a high velocity.

Acceleration calculation: Proton's mass=$1.67*10^{-27}$ Kg, the force applied=$7.6*10^{-12}$ Nt, thus the acceleration (a=F/m)=$4.5*10^{15}$ $ms^2$.

Assumption: the acceleration decreases by about five magnitudes due to the movement in the water, hence acceleration=$4.5*10^{10}$ $ms^2$.

Average time travel per ion: t=SQR(s*2/a), resulting in 267 ns (means that velocity=2.2 Km/s).

Production Calculations: (In a Single Working Space)

Capacitance of the insulation layer itself: (20*20 cm, 0.15 mm thick, dielectric constant=4)

$$C=8.85*10^{-12}*4*0.20*0.20/0.15*10^{-3}=9.4\ NF$$

For example, the charge needed for the development of 20V=(C*V)=$1.9*10^{-7}$ Coulomb.

A charge of this size is produced by $1.17*10^{12}$ ions. (A single working space pulls $7.2*10^{19}$ ions per second. Accordingly, the above listed small amount may accumulate within 16 ns).

Current Calculations: (Electrons Exchange Between Opposite Charged Ions)

A molecule is ionized for somewhere between 1 us and few tens of us (in accordance with water temperature) and the velocity of the pulled ions is extremely high.

Due to the insulation's durability and in order to prevent the screening of the electric force, development of high voltage on the face of the insulation should not be allowed.

Within tens of nano-seconds, enough ions are 'glued' and their charge must be taken away.

That is, a constant current that discharges this amount of ions and disables additional accumulation is needed.

For a cell producing 5 KWHr of Hydrogen energy, 0.65 $cm^3$ molecules must be ionized per second, thus performing electron exchange (i.e. current) for $2.2*10^{22}$ ions per second. A current of 1 A=$0.6*10^{19}$ electrons per second, hence the cell current=3660 A or 12 A between each pair of electrodes is needed.

The course of the flow is from the center of the flat conducting layer outwards, with the highest current at the edges (the area of the edges is around 4*20 cm).

Thus the resistance needed of the conductive layer (top layer) at each of the electrode pairs is around 0.1 Ohm, thus (for a low developed voltage of around 3 V) the resistance of 1 $cm^2$ at the electrode's edges is around 8 Ohm.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus to produce gas from liquid, said apparatus comprising:
    a first electric field source;
    a first deionization surface substantially consisting of a conductive substance and residing within the liquid and within a field line of said first electric field source:
    an insulation layer residing between said field source and the liquid electrically insulating said first electric field source from the liquid and the first deionization surface; and
    a grounding element comprised of an electric conductor connected to said first deionization surface, such that said grounding element discharges electric charge built up in said first deionization surface due to attracted ions at the first deionization surface;
    wherein the gas is produced upon the first deionization surface.

2. The apparatus according to claim 1, comprising a second deionization surface substantially consisting of a conductive substance.

3. The apparatus according to claim 2, wherein said first and second deionization surfaces are electrically connected.

4. The apparatus according to claim 1, further comprising a second electric field source.

5. The apparatus according to claim 1, further comprising an electric power source adapted to charge said first field source.

6. The apparatus according to claim 5, further comprising a switching circuit adapted to switchably connect said power source to said field source.

7. The apparatus according to claim 6, wherein said switching circuit includes a diode.

8. The apparatus according to claim 1, further comprising a field shielding structure adapted to shield said grounding element from electric fields.

9. The apparatus according to claim 8, wherein said field shielding structure is grounded.

10. The apparatus according to claim 9, wherein said first deionization surface is grounded through a ground switch, which ground switch is adapted to oscillate.

11. A method of producing gas from liquid, said method comprising:
- placing a first electric field source aside a container of liquid such that field lines of the first electric field source pass through the liquid;
- placing a first deionization surface, substantially consisting of a conductive substance, within the liquid and within a field line of said first electric field source electrically insulating said first electric field source from the liquid and the first deionization surface by placing a non-conductive material between the liquid and the first electric field source; and
- discharging electric charge built up on the first deionization surface by connecting the first deionization surface to a grounding element comprised of an electric conductor;
- wherein the as is produced upon the first deionization surface.

12. The method according to claim 11, further comprising placing a second deionization surface, substantially consisting of a conductive substance, within the liquid.

13. The method according to claim 12, further comprising electrically connecting said first deionization surface to said second deionization surface.

14. The method according to claim 11, further comprising placing a second electric field source aside the container of liquid such that field lines of the second electric field source pass through the liquid.

15. The method according to claim 11, further comprising shielding said grounding element from the first electric field source.

16. The method according to claim 15, further comprising grounding a shielding element used to perform said shielding.

17. The method according to claim 11, wherein said grounding element comprises an oscillating ground switch.

* * * * *